United States Patent
Wimalasena et al.

(10) Patent No.: US 12,413,946 B2
(45) Date of Patent: Sep. 9, 2025

(54) METHODS AND SYSTEMS FOR ESTABLISHING A BI-DIRECTIONAL COMMUNICATION LINK BETWEEN A HOST DEVICE AND A BARCODE READER

(71) Applicant: ZEBRA TECHNOLOGIES CORPORATION, Lincolnshire, IL (US)

(72) Inventors: Nilusha Niwanthaka Wimalasena, Homagama (LK); Chaminda Weerakkody, Peradeniya (LK); Kenneth S. Bhella, Stony Brook, NY (US); Mariya Wright, Cortland Manor, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/005,105

(22) Filed: Aug. 27, 2020

(65) Prior Publication Data
US 2022/0070640 A1 Mar. 3, 2022

(51) Int. Cl.
*H04W 4/80* (2018.01)
*G06F 7/58* (2006.01)
*G06K 7/10* (2006.01)
*G06K 7/14* (2006.01)
*H04W 76/14* (2018.01)

(52) U.S. Cl.
CPC .............. *H04W 4/80* (2018.02); *G06F 7/588* (2013.01); *G06K 7/10722* (2013.01); *G06K 7/1413* (2013.01); *H04W 76/14* (2018.02)

(58) Field of Classification Search
CPC ......... H04W 4/80; H04W 76/14; G06F 7/588; G06F 7/10722; G06F 7/1413; G06F 7/1417
See application file for complete search history.

(56) References Cited

U.S. PATENT DOCUMENTS

| | | | | |
|---|---|---|---|---|
| 9,848,457 | B1* | 12/2017 | Yae | H04W 76/14 |
| 10,187,362 | B1* | 1/2019 | McClintock | H04L 63/0272 |
| 10,278,152 | B2* | 4/2019 | Kim | H04W 8/005 |
| 2005/0194446 | A1 | 9/2005 | Wiklof et al. | |
| 2010/0241857 | A1* | 9/2010 | Okude | H04L 9/3226 713/168 |
| 2011/0081860 | A1* | 4/2011 | Brown | G06F 21/35 455/41.3 |
| 2015/0050887 | A1* | 2/2015 | Brown | G06F 21/44 455/41.2 |

(Continued)

OTHER PUBLICATIONS

International Search Report and Written Opinion for International Application No. PCT/US2021/040046 mailed on Sep. 16, 2021.

*Primary Examiner* — Junpeng Chen
(74) *Attorney, Agent, or Firm* — Yuri Astvatsaturov

(57) ABSTRACT

Methods and systems for establishing a bi-directional communication link between a host device and a barcode reader are disclosed herein. In an embodiment, the present invention enables a barcode reader to pair with a host device by way of advertising a unique identification code that is generated by the host device and passed thereto via a barcode. Responsive to detecting the unique identification code, the host device is operable to connect to the barcode reader.

15 Claims, 6 Drawing Sheets

(56) References Cited

U.S. PATENT DOCUMENTS

| | | | | |
|---|---|---|---|---|
| 2016/0037573 | A1* | 2/2016 | Ko | G06F 3/012 |
| | | | | 455/41.2 |
| 2017/0270261 | A1* | 9/2017 | Contolini | G06T 7/74 |
| 2017/0367124 | A1 | 12/2017 | Bhella et al. | |
| 2018/0091303 | A1 | 3/2018 | Brook et al. | |
| 2018/0103229 | A1* | 4/2018 | Yang | H04N 23/60 |
| 2020/0364323 | A1* | 11/2020 | Bendersky | H04L 9/3263 |

* cited by examiner

METHODS AND SYSTEMS FOR ESTABLISHING A BI-DIRECTIONAL COMMUNICATION LINK BETWEEN A HOST DEVICE AND A BARCODE READER

BACKGROUND

Handheld barcode readers are commonly used in a variety of environments such as warehouse and retail settings. Typically, these barcode readers are dedicated devices which lack significant processing power to run extensive operating systems and applications. For this reason, in some instances they have to be paired with host devices like mobile computers (e.g., Android-based or iOS-based mobile computers/phones/tablets). Additionally, to expedite this process and reduce human error, it is preferable to make the pairing simple with reduced number of steps which would require human interaction.

Additionally, there exist instances where operators of barcode readers require for instant printing of various indicia upon reading barcodes. This requires that the barcode reader be paired with a printer.

Accordingly, there is a need for improved processes and systems for establishing bi-directional communication links between a host device and a barcode reader.

SUMMARY

In an embodiment, the present invention is a method for establishing and maintaining a bi-directional wireless communication link between a host device and a barcode reader. The method includes: generating a unique identification code (UIC), the UIC excluding a media access control (MAC) address of a host device radio; encoding the UIC in a barcode; displaying the barcode on at least one of a display of the host device via an application or a print media of the host device via printing the barcode on the print media; capturing an image including the barcode via the barcode reader; processing, via the barcode reader, the image to decode the barcode and extract the UIC from the barcode; advertising, via a barcode reader radio, the UIC; detecting, via the host device, the barcode reader advertising the UIC; and responsive to the host device detecting the barcode reader advertising the UIC, pairing the host device with the barcode reader to establish the bi-directional wireless communication link.

In another embodiment the present invention is a system that includes: a host device having a host device controller, a host device radio, an application executing on the host device, and at least one of a display or a print head, wherein the host device controller is configured to: generate a unique identification code (UIC), the UIC excluding a media access control (MAC) address of a host device radio; encode the UIC in a barcode; and display the barcode on at least one of a display of the host device via an application or a print media of the host device via printing the barcode on the print media. The system also includes a barcode reader having a barcode reader controller, an imaging assembly, a barcode reader radio, wherein the barcode reader controller is configured to: responsive to an activation trigger, cause the imaging assembly to capture an image including the barcode; process the image to decode the barcode and extract the UIC from the barcode; and cause the barcode reader radio to advertise the UIC. The system is configured such that the host device controller is further configured to: detect the barcode reader advertising the UIC; and responsive to the detecting the barcode reader advertising the UIC, pair the host device with the barcode reader to establish the bi-directional wireless communication link.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
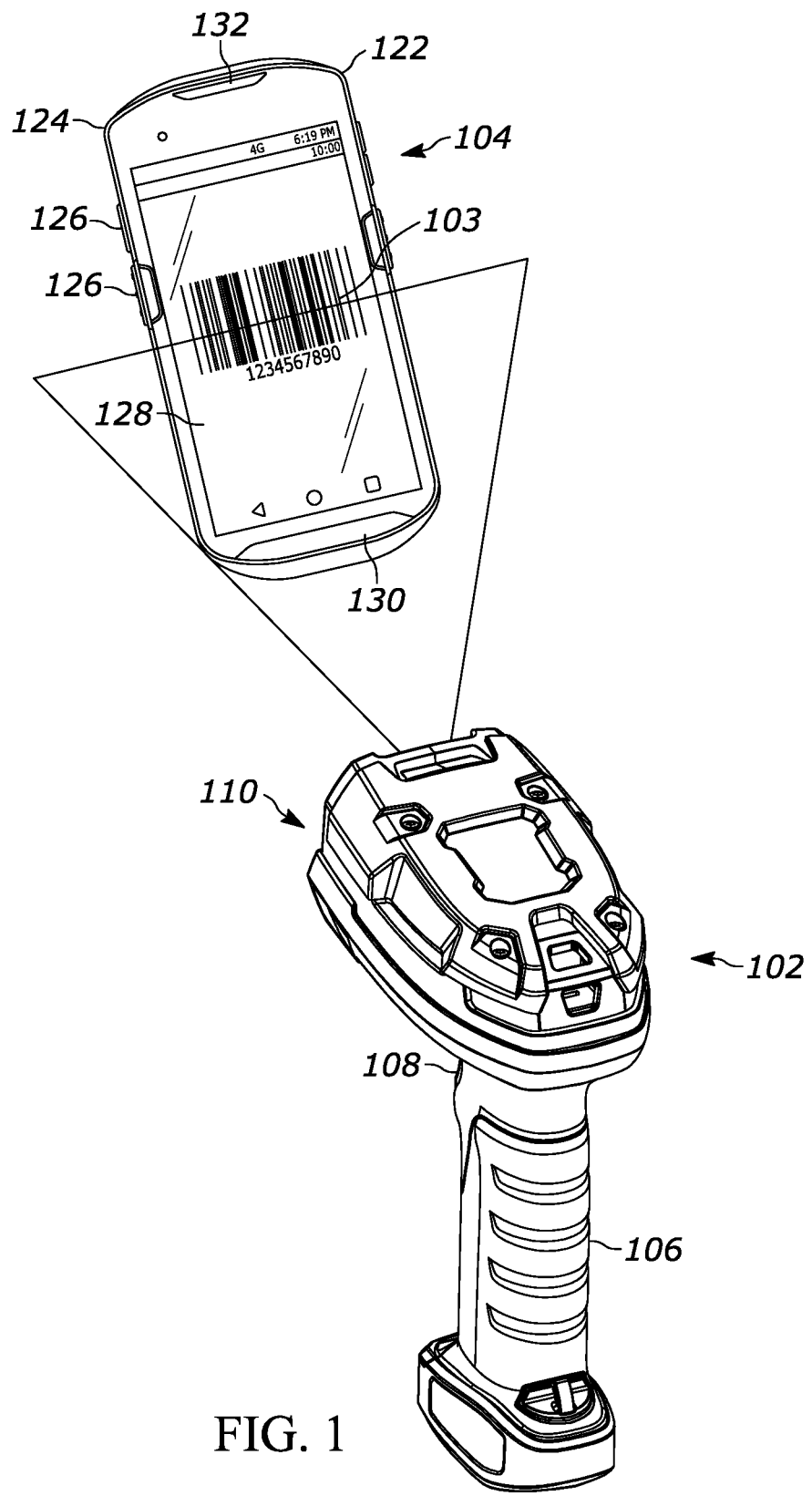
FIG. 1 illustrates an embodiment of the present invention where a barcode reader is being paired with a mobile device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring to the figures in more detail, FIG. 1 illustrates an example of a system 100 representative of an embodiment of the present invention. System 100 includes a barcode reader 102 and a host device 104. The barcode reader 102 and host device 104 are configured to have a bi-directional communication link therebetween to allow for exchange of information between the two devices.

The exemplary barcode reader 102 includes a housing 106 with a cavity for housing internal components, a trigger 108, and a window 110. The barcode reader 102 can be used in a hands-free mode as a stationary workstation when it is placed on the countertop in a supporting cradle (not shown). The barcode reader 102 can also be used in a handheld mode when it is picked up off the countertop (or any other surface) and held in an operator's hand. In the hands-free mode, products can be slid, swiped past, or presented to the window 110. In the handheld mode, the barcode reader 102 can be aimed at a barcode on a product, and the trigger 108 can be manually depressed to initiate imaging of the barcode. In some implementations, the supporting cradle can be omitted, and the housing 106 can also be in other handheld or non-handheld shapes.

Figure 2:
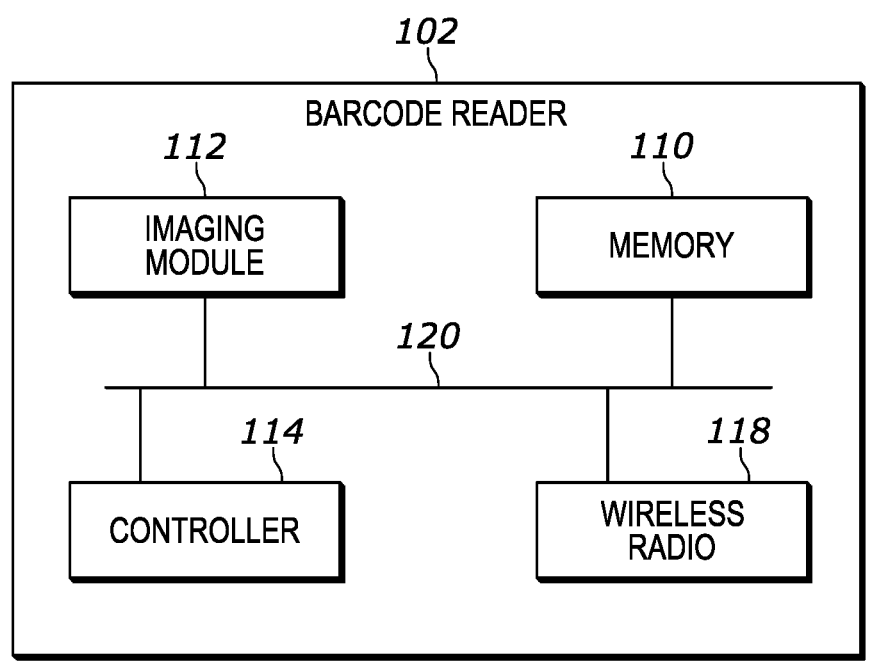
FIG. 2 is an exemplary block diagram of at least some components of the barcode reader of FIG. 1.

Internally, as shown in FIG. 2, the barcode reader is comprised of an imaging module 112, a controller 114, memory 116, and a wireless radio 118. Each of these components can be connected to each other component via a communication bus 120 and/or directly as required by the hardware architecture. In particular, the controller can be configured to control various elements of the barcode reader 102 like the imaging module 112 and wireless radio 118 in response to some type of a trigger. In some instances, the host device 104 may be communicatively coupled to an external server 119 which may supplement or act in place of the controller 134. For purposes of this disclosure, references to a host device controller shall be inclusive of an external server that may exercise certain level of control over the host device.

Referring back to FIG. 1, the exemplary host device 104 is illustrated as a hand-held mobile computer 122. It includes a housing 124, input button(s) 126, a display 128, a microphone 130, and a speaker 132. The host device 104 is configured in a manner that is similar to an enterprise mobile telephone/computer and can display a variety of information on its display 128 which can serve as a user interface to allow the operator of the host device to interact therewith. However, the host device may take other forms, including tablets, laptop computers, and so on. In some embodiments, the display 128 is a touch-screen display that allows the user to interact with information presented on the display 128 by way of tactile touch using a finger or a stylus. It will be appreciated that while the host device 104 is shown as a mobile computer 122, this is merely exemplary and the host device can be embodied in other devices which wirelessly interact with the barcode reader 102 to exchange information therewith.

Figure 3:
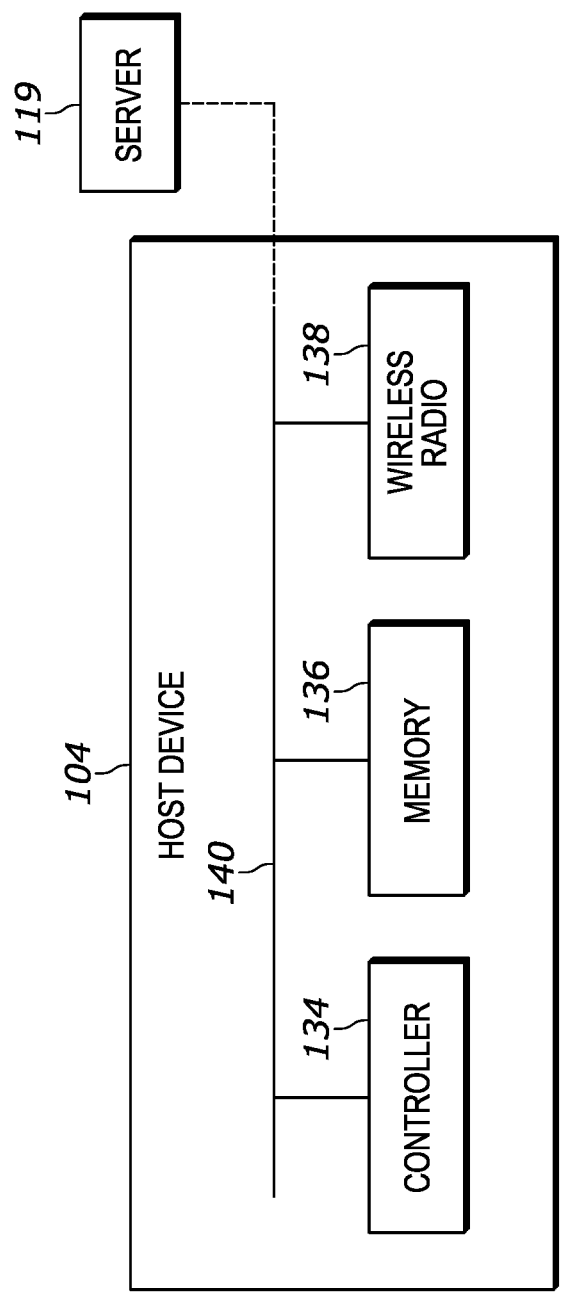
FIG. 3 is an exemplary block diagram of at least some components of the host device of FIG. 1.

Internally, as shown in FIG. 3, the host device 104 includes a controller 134, a memory 136, and a wireless radio 138. These components can be linked via a common bus 140 or directly to each other as required by hardware architecture. In the present case, the controller can be configured to control various elements of the host device 104, including the display 128 and the wireless radio 138.

In preferred embodiments, the wireless radio of the barcode reader 102 and the host device 104 utilize short range wireless communication hardware and protocol(s) to establish the bi-directional therebetween. This means that the barcode reader 102 and the host device 104 can be configured to communicate via, for example, the Bluetooth, low-energy Bluetooth, and/or Wi-Fi protocol.

Figure 4:
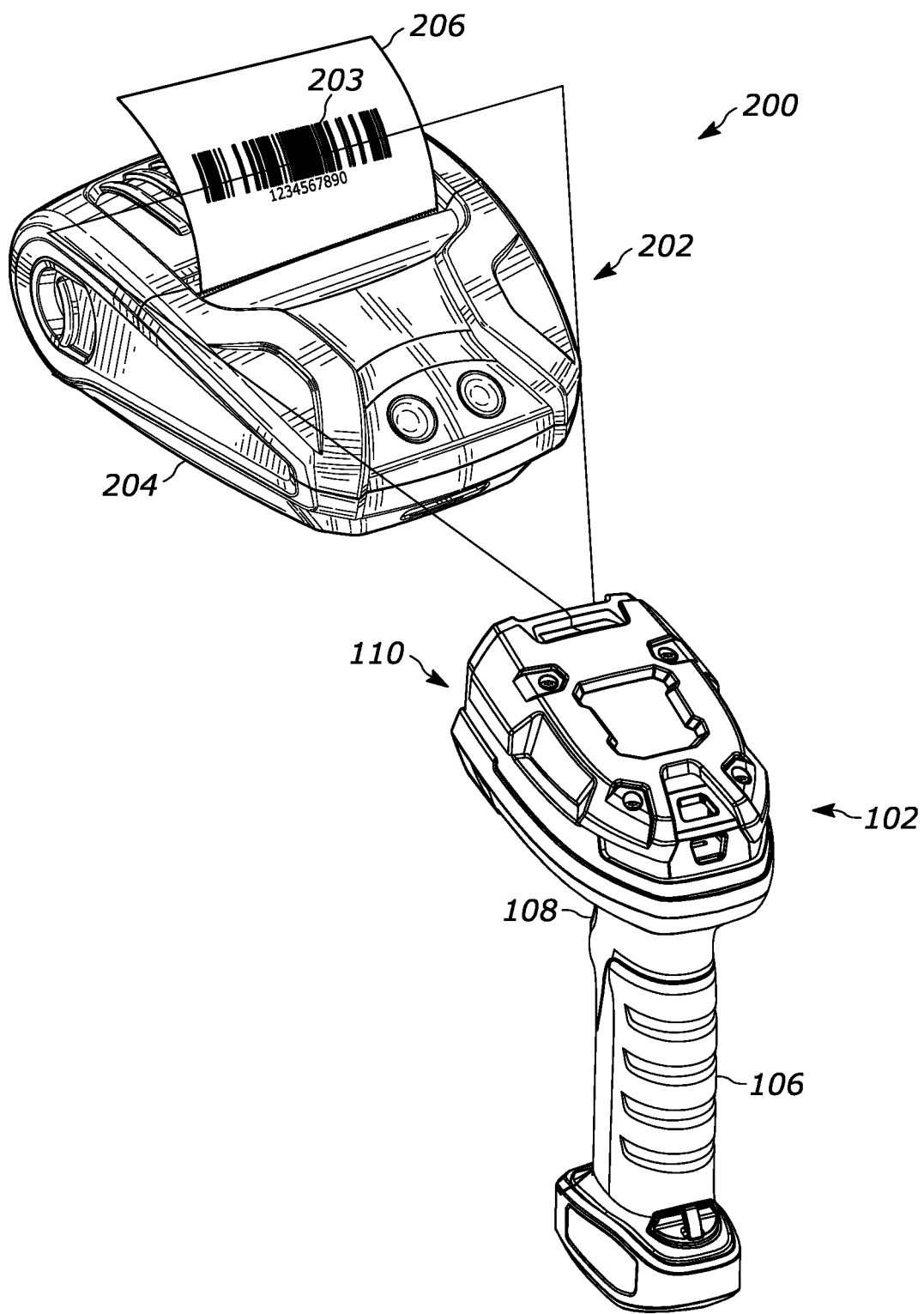
FIG. 4 illustrates an embodiment of the present invention where a barcode reader is being paired with a printer.
Figure 5:
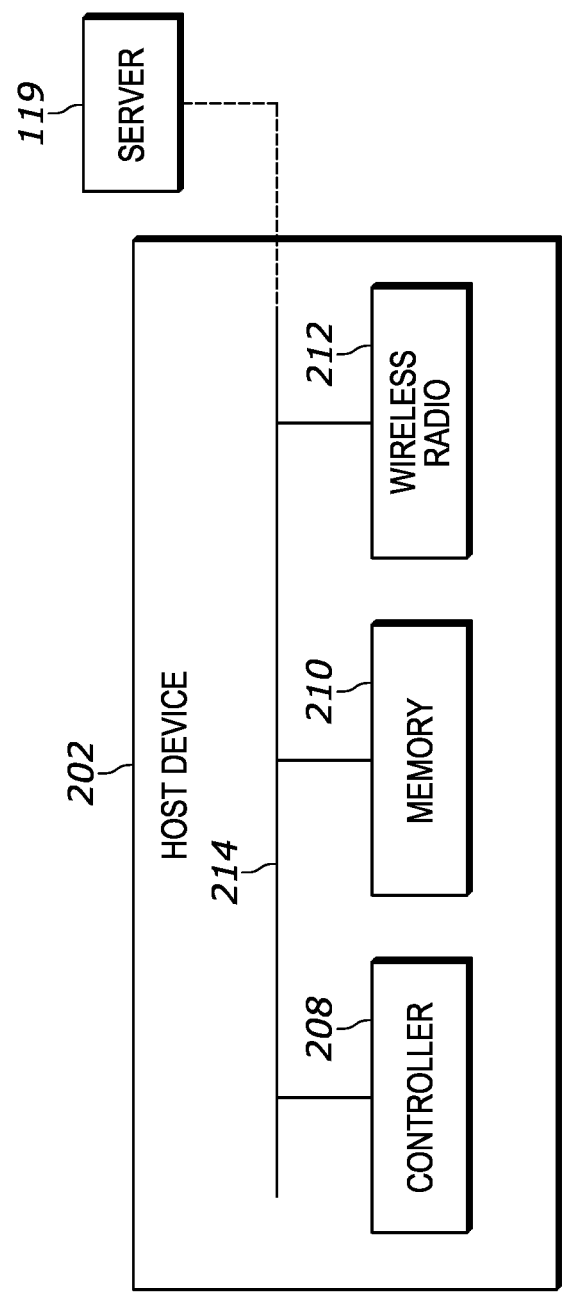
FIG. 5 is an exemplary block diagram of at least some components of the host device of FIG. 4.
Figure 6:
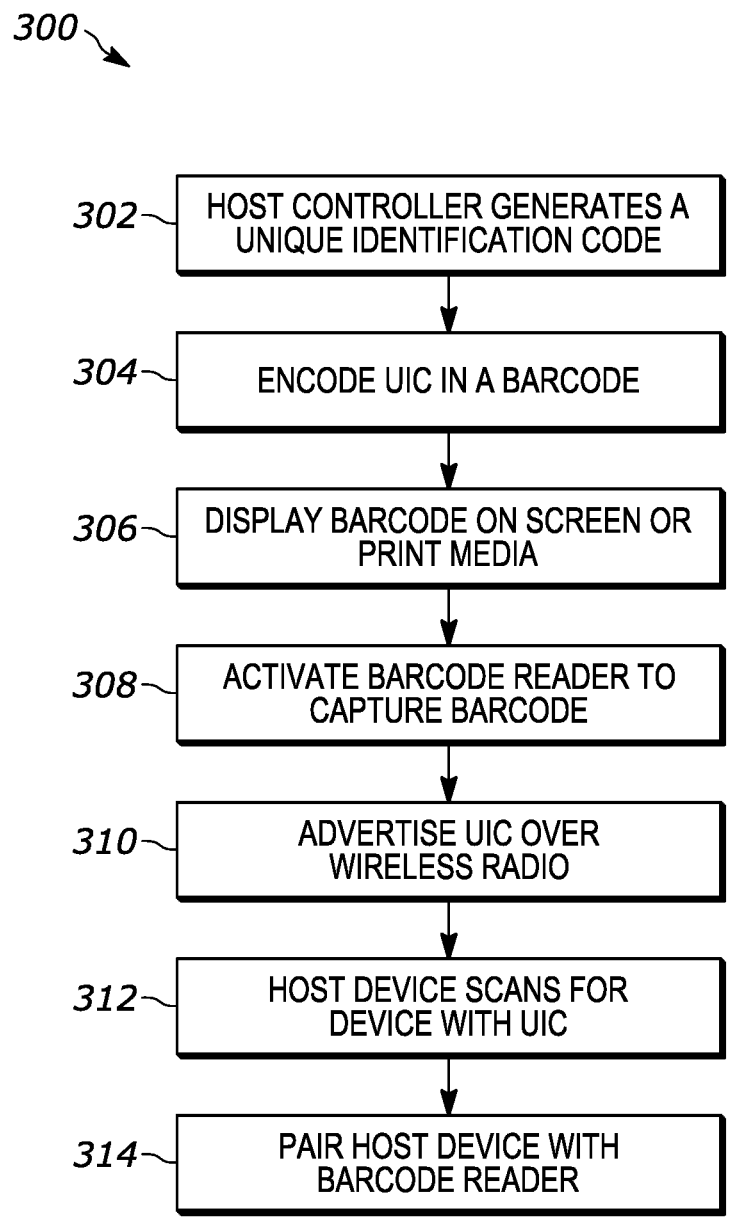
FIG. 6 illustrates a flowchart representative of a method for establishing and maintaining a bi-directional wireless communication link between a host device and a barcode reader, in accordance with an embodiment of the present invention.

FIG. 4 shows yet another example of a system 200 representative of an embodiment of the present invention. In this system, the hand-held mobile computer 122 of system 100 is replaced with a printer 202 operable to print indicia on print media and wirelessly communicate with an external device. More specifically, the printer 202 includes a housing 204, print media 206, and a print head used to print the indicia. Additionally, as shown in FIG. 5, internally the printer 202 includes a controller 208, a memory 210, and a wireless radio 212. These components can be linked via a common bus 214 or directly to each other as required by hardware architecture. In the present case, the controller can be configured to control various elements of the host device 104 (in this case the printer 202), including the print head and the wireless radio 212. In some instances, the host device 104 may be communicatively coupled to an external server 119 which may supplement or act in place of the controller 208. For purposes of this disclosure, references to a host device controller shall be inclusive of an external server that may exercise certain level of control over the host device. It should also be appreciated the that host device printer 202 may also include a display which may be used to display various information, including barcode information.

With reference to FIGS. 1-5 and FIG. 6 which outlines an exemplary process flow 300 for working at least some embodiments of the present invention, the barcode reader 102 and the host device 104 can be paired in the following manner. In step 302, the host controller 134,208,119 generates a unique identification code (UIC). This UIC specifically excludes a media access control (MAC) address of the host device's wireless radio and can be based at least in part on at least one of a serial number of the host device, a model number of the host device, an international mobile equipment identity number of the host device, a time-stamp, or a random number generator.

The generation of the UIC in a way that excludes the MAC address of the host's wireless radio is particularly advantageous when used in connection with the Android™ and iOS™-based host devices. This is because these operating systems have implemented security measures which make it difficult for third party applications to obtain the radio's MAC address. Such difficulty in obtaining the MAC address can translate into seamless pairing of the host with external devices. Not having to rely on a MAC address enables the pairing process to remain relatively simple, leading to fewer chances for human error (e.g., inadvertent manual mis-entry of the device's MAC address) while maintaining speed and efficiency.

Moreover, when there are more than one barcode reader communicable applications running on the host, the pairing of the host device and the barcode reader based on the host device's MAC address, does not facilitate the connection of the barcode reader to a specific application. Instead, the connection is made generally between the barcode reader and the host device, which may be less secure and/or may not allow for automatic presetting of settings based on an application that's in use.

Next, in step 304, the host controller 134,208,119 encodes the UID into a barcode (shown as barcode 103 in FIG. 1 and barcode 203 in FIG. 5). The barcode can be a one-dimensional barcode (e.g., UPC, code 39, code 128, EAN-13, etc.) or a two-dimensional barcode (e.g., QR code, PDF147, Data Matrix, GS1, etc.). In preferred embodiments, the barcode is a parameter-setting barcode that includes the UID along with a trigger indicator configured to signal to the barcode reader 102 that certain parameters within the barcode reader must be changed (e.g., the barcode reader is to pair for an external device). Additionally, in some embodiments the barcode may include a default-setting trigger where responsive to detecting, by the barcode reader 102, the presence of this trigger, at least some settings of the barcode reader are set to their default settings. Setting the barcode reader to its default parameters can help ensure a more seamless pairing with the host device. Furthermore, in some embodiments the barcode may include a communication protocol indicator where responsive to detecting, by the barcode reader 102, the presence of the communication protocol indicator, the pairing of the host device with the barcode reader is based at least in part on the communication protocol indicator.

It should be appreciated that either one of both steps 302 and 304 may be the result of the controller 134,208,119 executing a set of instructions stored in the memory of either the host device or the server communicatively coupled thereto. As such, such environment shall be referred to herein as an application and can include a standalone application executing on top of an operating system, an operating system service, or can be built into the operating system all together. Moreover, the application can be executed in software and/or firmware environment(s). Thus, the UIC may be generate and encoded into the barcode either at the server 119 or at the host device 104, either at the software level or at the firmware level.

Next, in step 306, the barcode is presented for use by the barcode reader 102. In some embodiment, the barcode 103 is presented on a screen 128 of the host device 122. This can be done by instructing the host device 122 to display the barcode on the screen as an image. In other embodiments, the barcode 203 is presented on a print media of the host device 202. This can be done by instructing the host device 202 to print the barcode as an indicia on the print media and express the print media from the device housing. In instances of the host device being a printer 202, the printed portion of the media with the barcode may be detached from the rest of the print media by, for example, tearing it off and later making it available to the barcode reader.

Once the barcode has been presented for viewing, the barcode reader 102 is activated, in step 308, so as to capture an image which includes the barcode therein. Normally, this can be done by activating the barcode reader's trigger to initiate image capture, via an imaging assembly, and the subsequent processing of those images by the barcode reader. Images are normally captured over a 1D or a 2D field of view of view and are processed to locate the presence of and a subsequent decode of a barcode therein. Upon decoding the barcode, the barcode reader is able to extract the payload originally encoded into the barcode and act thereupon.

Responsive to capturing an image of the barcode and identifying it as the parameter-setting barcode with the UIC, the barcode reader 102, in step 310, begins to wirelessly advertise the UIC. More specifically, upon identifying the barcode, the barcode reader's controller 114 instructs the wireless radio 118 to advertise the UIC via a wireless signal and/or pursuant to the protocol that was indicated in the barcode. Instructions which enable the controller and wireless radio to function in the specified manner can be stored in the barcode reader's memory 110 and may be executed at, for example, the firmware level and/or software level.

At the same time, in step 312, the host device 104 scans for a wireless signal, via its own wireless radio 138,212 as instructed by the controller 134,208. Instructions which enable the controller 134,208 and wireless radio 138,212 to function in the specified manner can be stored in the host device's memory 136, 210 and may be executed at, for example, the firmware level and/or software level. It should be appreciated that the advertising of the UIC by the barcode reader and the searching for a device advertising the UIC by the host device do not have to occur concurrently and each of the devices may initiate its function ahead of the other. Thus, for example, while the host device may start looking for a device advertising a UIC upon encoding the UIC in a barcode and presenting it to the user, the barcode reader may start advertising the UIC sometime later and only after it captures the relevant barcode. Additionally, the host device may cease to search for a device advertising the UIC after some predetermined passage of time if no connection is established.

Upon detecting the barcode reader advertising the UIC, in step 314, the host device and the barcode reader initiate a pairing process which, when successful, establishes a bi-directional wireless communication link between the barcode reader and the host device. Once established, this link can enable the barcode reader to transmit data to the host device for, for example, database storage, further uplink transmission, analysis, printing, and so on. Additionally, the host device may further configure the barcode reader based on certain preset settings. It should be appreciated that additional security measures can be built into the pairing process whereby acknowledgement(s) and/or passcode(s) may be required at either end of the communication link.

In some instances, the UIC is specific to a particular application executing on the host device. Having such a configuration can increase security whereby communication with the host device is limited to instances where the specific application is running on the host device. Additionally, the host device may be configured such that all paired devices are unpaired after some time and a repairing of devices may be necessary. This may be desirable in instances where, for example, a first crew operates the barcode readers on day one and another crew operates the readers on day two. Resetting the paired connection between the shifts can allow the accurate selection of a barcode reader/host device pair. Similarly, an unpairing of a barcode reader and the host device may be based on an individual operator's shift hours.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for establishing and maintaining a bi-directional wireless communication link between a host device and a barcode reader, the method comprising:
   generating a unique identification code (UIC), the UIC excluding a media access control (MAC) address of a host device radio;
   encoding the UIC, a communication protocol indicator, and a default-setting trigger in a barcode, wherein the communication protocol indicator is indicative of a communication protocol to be used to establish the bi-directional wireless communication link;
   displaying the barcode on at least one of a display of the host device via an application or a print media of the host device via printing the barcode on the print media;
   capturing an image including the barcode via the barcode reader;
   processing, via the barcode reader, the image to (i) decode the barcode and extract the UIC from the barcode, and (ii) detect a presence of the communication protocol indicator in the barcode;
   advertising, via a barcode reader radio, the UIC;
   detecting, via the host device, the barcode reader advertising the UIC;
   responsive to the host device detecting the barcode reader advertising the UIC, pairing the host device with the barcode reader, based at least in part on the communication protocol indicator, to establish the bi-directional wireless communication link; and
   responsive to the processing the image to decode the barcode and detect, by the barcode reader, a presence of the default-setting trigger in the barcode, at least some settings of the barcode reader are set to their default settings.

2. The method of claim 1, wherein the UIC is based at least in part on at least one of a serial number of the host device, a model number of the host device, an international mobile equipment identity number of the host device, a time-stamp, or a random number generator.

3. The method of claim 1, wherein the barcode is a code 128 barcode.

4. The method of claim 1, wherein the generating the UIC is performed via the application executing on the host device.

5. The method of claim 4, wherein the encoding the UIC in the barcode is performed via the application executing on the host device.

6. The method of claim 1, wherein the bi-directional wireless communication link enables communication between the only the application and the barcode reader.

7. The method of claim 1, wherein the bi-directional wireless communication link is a short-range wireless communication link.

8. The method of claim 1, further comprising unpairing the host device and the barcode reader responsive to an activation of an unpairing trigger programmed into the application.

9. A system comprising:
a host device having a host device controller, a host device radio, an application executing on the host device, and at least one of a display or a print head, wherein the host device controller is configured to:
generate a unique identification code (UIC), the UIC excluding a media access control (MAC) address of the host device radio;
encode the UIC, a communication protocol indicator, and a default-setting trigger in a barcode, wherein the communication protocol indicator is indicative of a communication protocol to be used to establish a bi-directional wireless communication link; and
display the barcode on at least one of a display of the host device via an application or a print media of the host device via printing the barcode on the print media; and
a barcode reader having a barcode reader controller, an imaging assembly, a barcode reader radio, wherein the barcode reader controller is configured to:
responsive to an activation trigger, cause the imaging assembly to capture an image including the barcode;
process the image to (i) decode the barcode and extract the UIC from the barcode and (ii) detect a presence of the communication protocol indicator in the barcode; and
cause the barcode reader radio to advertise the UIC,
wherein the host device controller is further configured to:
detect the barcode reader advertising the UIC;
responsive to the detecting the barcode reader advertising the UIC, pair the host device with the barcode reader to establish the bi-directional wireless communication link;
communicate with the host device based at least in part on the communication protocol indicator; and
responsive to processing the image to decode the barcode and detect a presence of the default-setting trigger in the barcode, set at least some settings of the barcode reader to their default settings.

10. The system of claim 9, wherein the UIC is based at least in part on at least one of a serial number of the host device, a model number of the host device, an international mobile equipment identity number of the host device, a time-stamp, or a random number generator.

11. The system of claim 9, wherein the barcode is a code 128 barcode.

12. The system of claim 9, wherein the host device controller is further configured to generate the UIC via the application executing on the host device.

13. The system of claim 12, wherein the host device controller is further configured to encode the UIC in the barcode via the application executing on the host device.

14. The system of claim 9, wherein the bi-directional wireless communication link enables communication between the only the application and the barcode reader.

15. The system of claim 9, wherein the bi-directional wireless communication link is a short-range wireless communication link.

* * * * *